V. E. D'URSO.
SOUND AMPLIFIER FOR PHONOGRAPHS.
APPLICATION FILED OCT. 6, 1909.
956,235.
Patented Apr. 26, 1910.
3 SHEETS—SHEET 1.
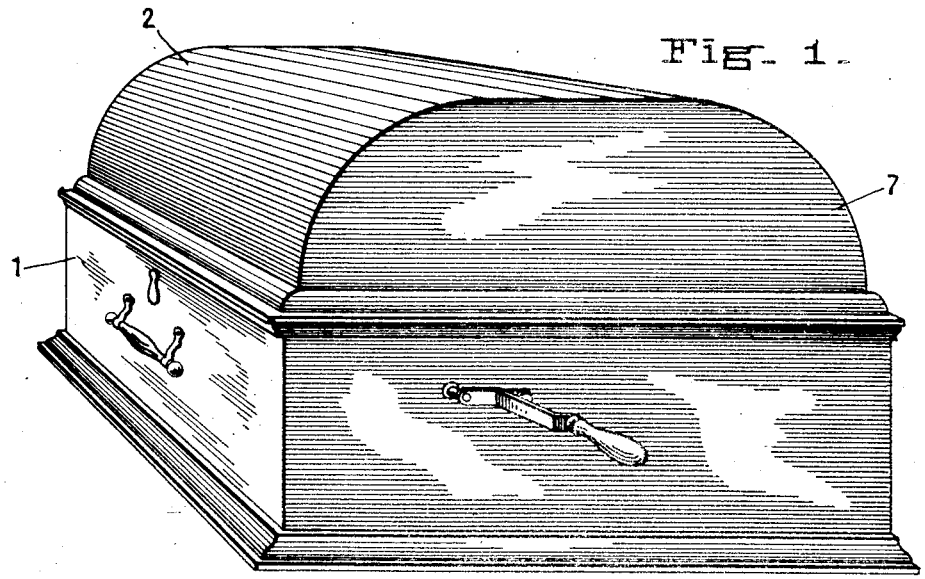
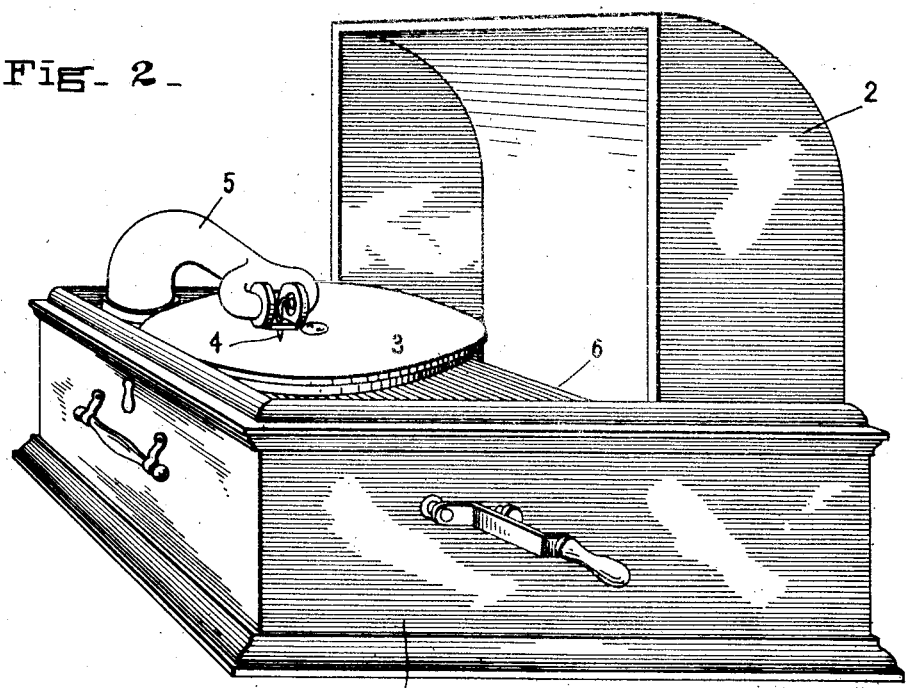
WITNESSES:
INVENTOR
Vito Ettore D'Urso.
BY
ATTORNEYS V. E. D'URSO.
SOUND AMPLIFIER FOR PHONOGRAPHS.
APPLICATION FILED OCT. 6, 1909.
956,235.
Patented Apr. 26, 1910.
3 SHEETS—SHEET 2.
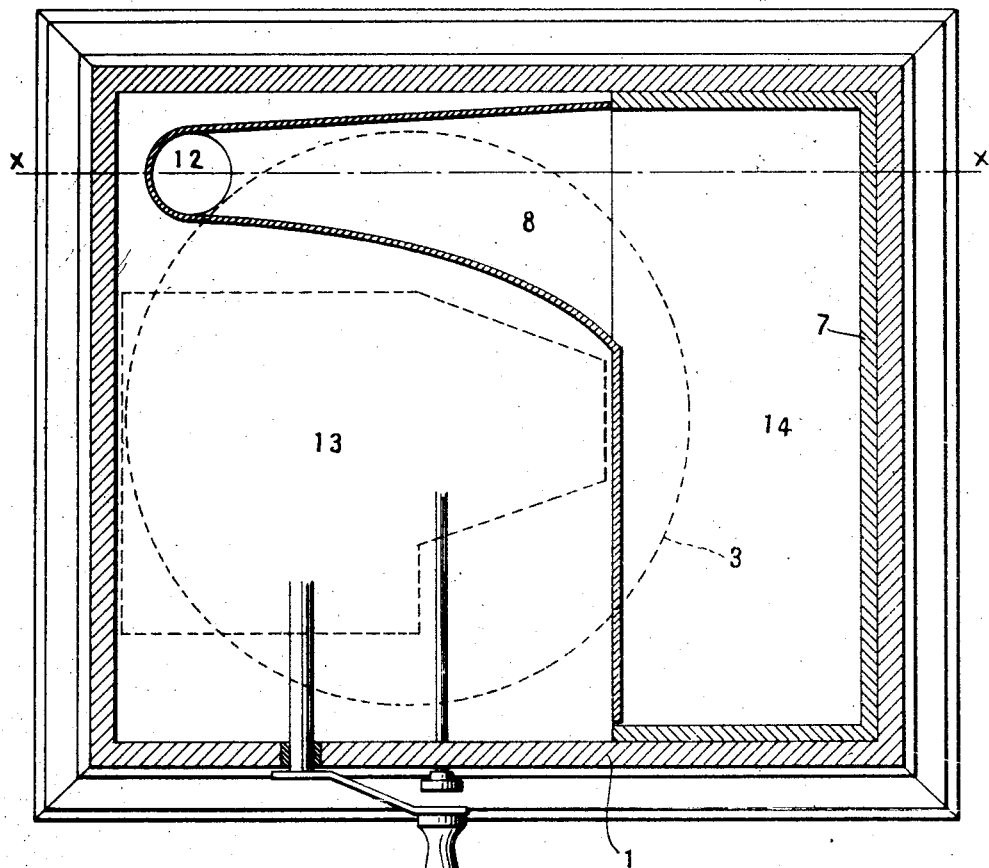
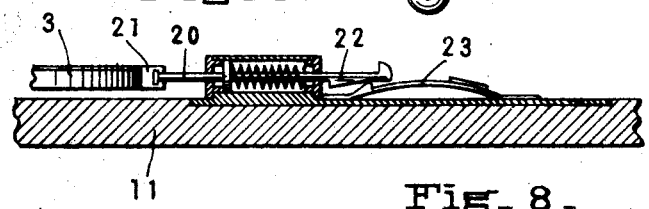
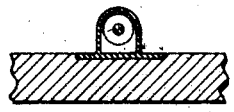
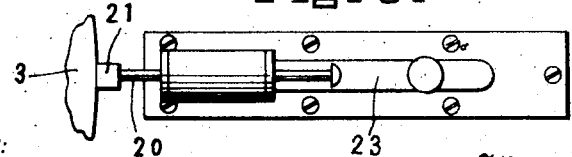
WITNESSES:
J Clyde Ripley
K. Brenner
INVENTOR
Vito Ettore D'Urso.
BY
Barber
ATTORNEYS

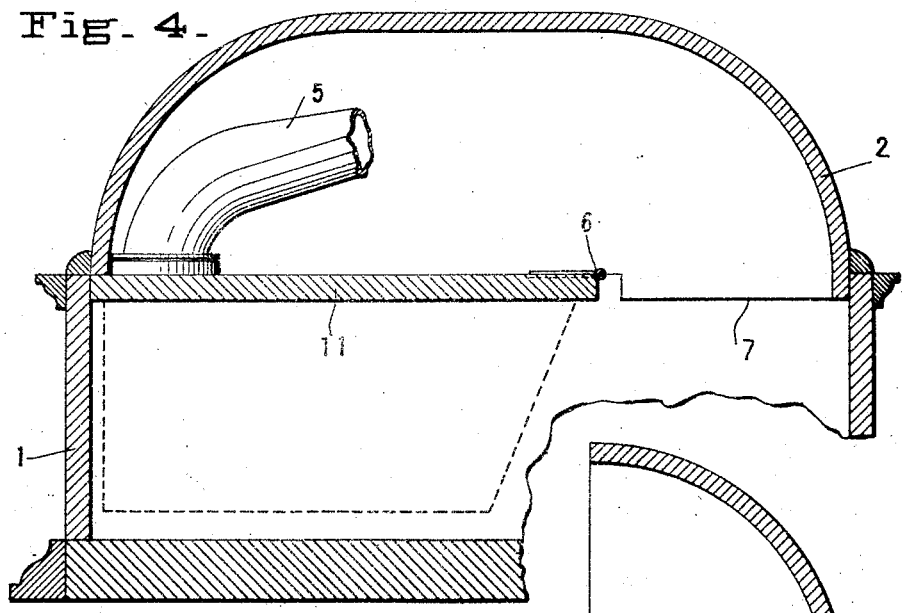
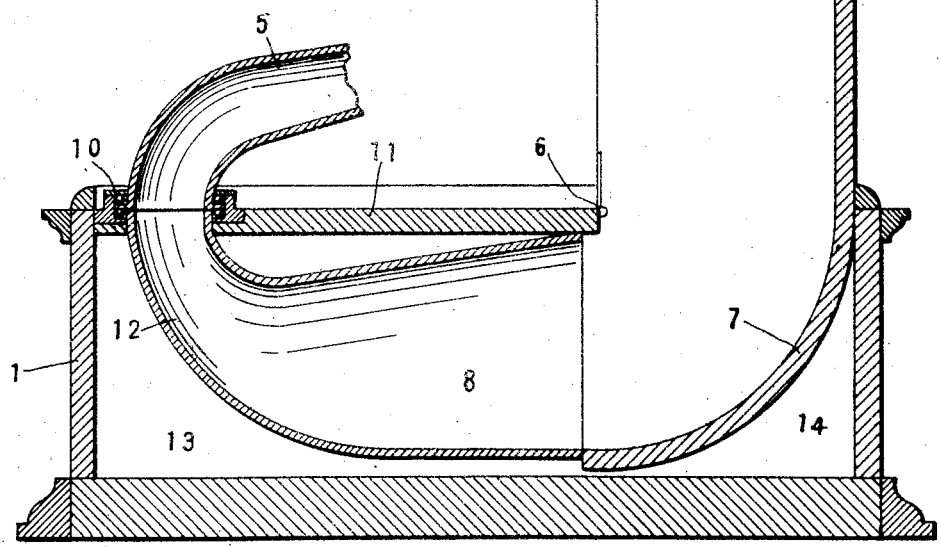

UNITED STATES PATENT OFFICE.

VITO ETTORE D'URSO, OF NEW YORK, N. Y.

SOUND-AMPLIFIER FOR PHONOGRAPHS. REISSUED

956,235.      Specification of Letters Patent.      Patented Apr. 26, 1910.

Application filed October 6, 1909. Serial No. 521,247.

*To all whom it may concern:*

Be it known that I, VITO ETTORE D'URSO, a subject of King Victor Emmanuel III of Italy, now residing in New York, in the county of New York and State of New York, have invented certain new and useful Improvements in Sound-Amplifiers for Phonographs, of which the following is a full, clear, and exact description, whereby any one skilled in the art may make and use the same.

The invention relates to a device for amplifying the sounds resulting from the contact of a reproducer with a record and more particularly to a self-contained device, in which the inclosing casing for the mechanism co-acts to secure the amplifying effect of the sound which is induced by the reproducer of a phonographic instrument.

The objects of the invention are to provide a simple and compact device in which the inclosing casing may be utilized as a sound amplifier.

A further object is to provide a device which will dispense with the ordinary horn type of amplifier and secure the necessary amplification of sound by utilizing a direct channel for the transmission of sound from the disk or record through the inclosing casing of the device.

A still further object is to provide a casing in the form of a sound amplifier, which, in normal position, will inclose the parts of the mechanism and when opened for use will provide an amplifying or sound-board effect, which will give clear unobstructed tones.

Referring to the drawings: Figure 1 is a perspective view of the device illustrating the application of the amplifier. Fig. 2 is a similar view showing the casing in position to produce the amplification of sound. Fig. 3 is a plan view of the device illustrated in Figs. 1 and 2, partially cut in section and broken away to illustrate the sound-conducting channels. Fig. 4 is a transverse sectional view on the central line of Fig. 3. Fig. 5 is a sectional view on the line *x—x* of Fig. 3. Fig. 6 is a detail view illustrating a stop for the record. Fig. 7 is a cross-sectional view through the mechanism illustrated in Fig. 6. Fig. 8 is a plan view of the mechanism illustrated in Fig. 6.

Ordinarily there is used in connection with a reproducer for phonographic instruments, a horn or similar device for amplifying the sound emanating from the reproducer. Such devices must necessarily be supported with reference to the disk or cylinder record and owing to uncertain balance may effect the reproduction of sound, causing improper action of the reproducer and a scarring of the record. Furthermore, such horns as have been commonly used, accentuate the mechanical sounds of the instrument and give a more or less "brassy" or "tinny" effect to the reverberations induced by the reproducer, passing over the record. Furthermore, such devices are cumbersome and require adjustment with reference to the instrument and must be applied to or removed from the instrument for the purposes of ordinary transportation.

It is one of the primal objects of the present invention to provide a simple inclosing casing for the mechanism of the instrument which, when opened in an ordinary manner, will provide an amplifier for the sound producing mechanism which will have all of the ordinary benefits of a horn or like amplifier, without its disadvantages. The results are obtained by utilizing an inclosing casing having a cover, and when opened, will form a sounding-board or amplifier and will be directly connected through a channel within the main casing with the reproducer which coöperates with the record.

Referring to the drawings the numeral 1, denotes a main casing which is of ordinary rectangular form as shown herein, and is provided with a hinged cover 2, which incloses the record disk 3, reproducer 4, and supporting arm 5. One portion of the main casing is occupied by the motor and mechanical mechanism, not specifically shown herein, and the cover 2, when opened, is so hinged on a line 6, that its rear end 7, passes down into the main casing 1, and registers with an interior channel 8, which supports the reproducer.

In Fig. 1, the device is shown as completely inclosed and in condition for transportation. In Fig. 2, the device is shown with the sound amplifying cover tilted back forming the sounding-board for amplifying the sounds induced by the reproducer 4.

Obviously, any form of reproducer or disk or record may be utilized in connection with the amplifying device herein described, and, of course, the motor and mechanical parts for rotating the disk or record of whatever form may be of any desired type in common use.

The reproducer is preferably mounted upon the arm 5, which is of tubular form suitably arranged upon ball-bearings or anti-friction-bearings 10, in the base or cover-plate 11, of the machine. Directly below the mounted end of the arm 5, and registering therewith is a tubular conduit 12, which connects with the chamber 14, arranged in one portion of the main casing 1, and of such a form that it will register with the end 7, of the cover 2, when the latter is opened. It will be seen from the above description that the main casing is really divided into two compartments, the compartment 13, being utilized for the mechanical parts for operating the records and the compartment 14, serving to receive the lower end of the cover 2, when it is tilted upon its hinged line 6. In other words, the cover is of reëntrant form hinged transversely in such a manner that when opened it will project into the compartment 14, and form a direct and inclosed sound-conveying channel from the reproducer 4. Being curved and of the proper form, it will receive the sound waves and deflect them outwardly, giving an amplifying effect which takes the place of the ordinary horn type of amplifier. At the same time, the amplifying device herein disclosed, forms a complete cover for the device.

Obviously, the inclosing casing and cover may be made from any desired material.

In Figs. 6 to 8, there is illustrated a form of stop device for the record which may be conveniently used in connection with the mechanism. This consists, briefly, of a plunger 20, having a buffer-face 21, adapted to come into or to be removed from contact with the supporting plate of the record. One end is provided with a latch 22, which, coöperating with a spring-latch 23, holds the plunger 20 in either of its positions of adjustment.

Obviously, the specific details of the mechanism may be varied to a considerable extent without departing from the spirit and intent of the invention, which contemplates an inclosing casing having various positions of adjustment, and providing a suitable sound amplifier, the whole mechanism, including the amplifier, being self-contained.

What I claim as my invention and desire to secure by Letters Patent is:—

1. A sound amplifier for phonographs or the like embodying a cover hinged to a main casing and having a portion thereof adapted to project inwardly into said casing when the cover is opened, a conduit arranged in the casing and opening toward the inwardly projecting portion of the cover, and a sound reproducer connected to the opposite end of said conduit.

2. In combination with a casing for a sound reproducing mechanism, a cover therefor hinged intermediate its ends, said cover having a portion adapted to project into the casing when the cover is in open position, a conduit extending through the casing and opening toward the inwardly projecting portion of the cover and a reproducer arm connecting with said conduit.

3. In combination with a sound reproducing mechanism, a casing comprising a main casing and a cover, said cover adapted when open to extend downwardly within said casing and project above said casing, a sound conveying conduit arranged in said casing and opening toward the downwardly projecting end of the cover, and a reproducer mechanism connecting with said conduit.

4. In combination with a sound producing mechanism having a casing, and a sound-conveying conduit with a compartment connecting with said conduit, a cover hinged above said compartment and adapted to be swung as to its lower end into said compartment connecting with the conduit and a reproducer mechanism connecting with said conduit.

VITO ETTORE D'URSO.

Witnesses:
 NICOLA FERRI,
 FORORI J. SPIELER.